(12) United States Patent
Aoki et al.

(10) Patent No.: US 8,831,378 B2
(45) Date of Patent: Sep. 9, 2014

(54) IMAGE TRANSFORMING DEVICE, ELECTRONIC DEVICE, IMAGE TRANSFORMING METHOD, IMAGE TRANSFORMING PROGRAM, AND RECORDING MEDIUM WHEREUPON THE PROGRAM IS RECORDED

(75) Inventors: Hiromatsu Aoki, Osaka (JP); Yen-Wei Chen, Shiga (JP); Masataka Seo, Shiga (JP); Mizuho Ohmura, Shiga (JP)

(73) Assignees: OMRON Corporation, Kyoto (JP); The Ritsumeikan Trust, Kyoto (JP)

( * ) Notice: Subject to any disclaimer, the term of this patent is extended or adjusted under 35 U.S.C. 154(b) by 137 days.

(21) Appl. No.: 13/643,919

(22) PCT Filed: Apr. 1, 2011

(86) PCT No.: PCT/JP2011/058401
§ 371 (c)(1),
(2), (4) Date: Oct. 26, 2012

(87) PCT Pub. No.: WO2011/135977
PCT Pub. Date: Nov. 3, 2011

(65) Prior Publication Data
US 2013/0039599 A1    Feb. 14, 2013

(30) Foreign Application Priority Data
Apr. 30, 2010    (JP) ................ 2010-105150

(51) Int. Cl.
G06K 9/36    (2006.01)
G06T 5/00    (2006.01)
G06T 11/60    (2006.01)
G06T 3/00    (2006.01)
G06T 11/00    (2006.01)
H04N 101/00    (2006.01)

(52) U.S. Cl.
CPC ................ G06T 11/60 (2013.01); G06T 5/006 (2013.01); G06T 3/0093 (2013.01); H04N 2101/00 (2013.01); G06T 11/00 (2013.01)
USPC ........................................... 382/276

(58) Field of Classification Search
CPC ........................... G06T 11/00; G06T 3/0093
USPC ................ 345/469; 379/221.09; 382/276
See application file for complete search history.

(56) References Cited

U.S. PATENT DOCUMENTS 5,539,868 A    7/1996 Hosoya et al.
5,852,447 A    12/1998 Hosoya et al.
(Continued)

FOREIGN PATENT DOCUMENTS

JP    5-127654 A    5/1993
JP    7-192123 A    7/1995
(Continued)

OTHER PUBLICATIONS

International Search Report w/translation from PCT/JP2011/058401 mailed on May 17, 2011 (4 pages).
(Continued)

Primary Examiner — Gregory F Cunningham
(74) Attorney, Agent, or Firm — Osha Liang LLP

(57) ABSTRACT

An image transforming device transforms a part of a captured image of an object based on a predetermined type of transformation. The image transforming device includes an obtaining unit that obtains the captured image of the object, a detecting unit that detects characteristic information from the captured image of the object, a grid point setting unit that sets grid points for the captured image, and setting movement information of the grid points based on the control points and the movement information of the control points, and an image transforming unit that transforms an image area by moving the grid points based on the movement information of the grid points.

6 Claims, 9 Drawing Sheets

(56) References Cited

U.S. PATENT DOCUMENTS

| | | |
|---|---|---|
| 7,324,669 B2 | 1/2008 | Nakanishi et al. |
| 2006/0133654 A1 | 6/2006 | Nakanishi et al. |
| 2008/0174795 A1 | 7/2008 | Andres Del Valle |
| 2008/0240516 A1 | 10/2008 | Hayaishi et al. |

FOREIGN PATENT DOCUMENTS

| | | | | |
|---|---|---|---|---|
| JP | 2001-209814 | * | 8/2001 | ............ G06T 11/80 |
| JP | 2001-209814 A | | 8/2001 | |
| JP | 2004-54759 A | | 2/2004 | |
| JP | 2004-264893 A | | 9/2004 | |
| JP | 2004264893 A | * | 9/2004 | ............ G06T 1/00 |
| JP | 2008-242807 A | | 10/2008 | |
| JP | 2008242807 A | * | 10/2008 | ............ G06T 3/00 |

OTHER PUBLICATIONS

Written Opinion of the International Searching Authority from PCT/JP2011/058401 mailed on May 17, 2011 (3 pages).

\* cited by examiner (a)

(b)

IMAGE TRANSFORMING DEVICE, ELECTRONIC DEVICE, IMAGE TRANSFORMING METHOD, IMAGE TRANSFORMING PROGRAM, AND RECORDING MEDIUM WHEREUPON THE PROGRAM IS RECORDED

TECHNICAL FIELD

The present invention relates to an image transforming device which transforms, in accordance with a predetermined type of transformation, at least a part of a captured image of an object to be subjected to image transformation, an electronic device, an image transforming method, an image transforming program, and a recording medium in which the image transforming program is recorded.

BACKGROUND ART

In recent years, hardware of digital image capturing devices such as a digital camera and a camera mobile phone has become increasingly multifunctional and highly functional. This has created a trend towards product differentiation by causing software to be more multifunctional and highly functional. Examples of such more multifunctional and highly functional software include a face transforming function of causing a face in a captured facial image to look smaller and/or funny by enlarging or reducing a part of the face.

Patent Literatures 1 to 3 disclose conventional techniques of the face transforming function. An image processing device described in Patent Literature 1 is arranged as below. A facial image is detected from a target image, and a plurality of division points are provided to the detected facial image in accordance with a predetermined arrangement pattern which is associated with a type of transformation. An area which is surrounded by the plurality of division points is transformed by moving the plurality of division points. As a result, the facial image is transformed.

An image processing device described in Patent Literature 2 is arranged as below. A facial area is extracted from an image of a person. A facial contour of the person is detected from the extracted facial area. A shape of the person's face is classified in accordance with the detected contour of the face of the person. Then, the facial contour of the person is corrected in accordance with the classified shape of the person's face. A facial image reshaping device described in Patent Literature 3 is arranged as below. Points are provided on an image of a face and a neck of a person, and a mesh is generated from the points so as to be superimposed on the image. The points are relocated by applying a deformation vector to each of the points, so that the mesh is transformed and a facial image is reshaped.

As described above, according to the conventional face transforming function, a facial image is detected from a target image, division points or a facial contour are/is arranged in accordance with the detected facial image, and the division points or the facial contour are/is moved in accordance with a type of transformation, so that an area surrounded by the division points or the contour of the face is transformed.

CITATION LIST

Patent Literatures

Patent Literature 1
Japanese Patent Application Publication, Tokukai, No. 2008-242807 (Publication Date: Oct. 9, 2008)

Patent Literature 2
Japanese Patent Application Publication, Tokukai, No. 2004-264893 (Publication Date: Sep. 24, 2004)

Patent Literature 3
U.S. Patent Application Publication, No. 2008/0174795 (Publication Date: Jul. 24, 2008)

SUMMARY OF INVENTION

Technical Problem

According to the conventional techniques, a plurality of division points or a facial contour are arranged in accordance with a detected facial image. Thus, in a case where a face of a facial image inclines, it is necessary to rotate the plurality of divided points or the facial contour in accordance with the inclination of the face. Therefore, it is necessary to find a boundary of an area surrounded by the plurality of division points or the facial contour and to determine, for each pixel of the image, in which area the each pixel is included. This results in an increase in processing load. Especially, a problem of a longer processing time occurs when the face transforming function is carried out in small-sized devices such as a digital camera and a camera mobile phone.

The present invention has been made in view of the problems, and an object of the present invention is to provide an image transforming device and the like which can reduce a processing load.

Solution to Problem

In order to attain the object, an image transforming device in accordance with the present invention which transforms at least a part of a captured image of an object based on a predetermined type of transformation, the image transforming device includes: obtaining means for obtaining the captured image of the object; detecting means for detecting characteristic information from the captured image of the object, the characteristic information characterizing the object, the captured image having been obtained by the obtaining means; control point setting means for setting control points and movement information of the control points for the captured image, based on the characteristic information detected by the detecting means and on an arrangement pattern and a movement pattern each corresponding to the predetermined type of transformation; grid point setting means for setting grid points for the captured image, and setting movement information of the grid points based on the control points and the movement information of the control points, the control points and the movement information each having been set by the control point setting means; and image transforming means for transforming an image area by moving the grid points based on the movement information of the grid points which movement information has been set by the grid point setting means, the image area being a quadrangle, the grid points being four vertices of the quadrangle.

In order to attain the object, an image transforming method in accordance with the present invention for transforming at least a part of a captured image of an object based on a predetermined type of transformation, the image transforming method includes the steps of: (a) obtaining the captured image of the object; (b) detecting characteristic information from the captured image of the object, the characteristic information characterizing the object, the captured image having been obtained in the step (a); (c) setting control points and movement information of the control points for the captured image, based on the characteristic information detected in the step (b) and on an arrangement pattern and a movement pattern each corresponding to the predetermined type of transformation; (d) setting grid points for the captured image, and setting movement information of the grid points based on the control points and the movement information of the control points, the control points and the movement information each having been set in the step (c); and (e) transforming an image area by moving the grid points based on the movement information of the grid points which movement information has been set in the step (d), the image area being a quadrangle, the grid points being four vertices of the quadrangle.

Note here that the predetermined type of transformation is exemplified by a smaller face transformation. In case of a facial image, examples of the characteristic information include outer canthi, inner canthi, edges of a mouth, a central point of a face, an edge of a chin, and temples.

According to the arrangement and the method, when a captured image of the object is obtained, characteristic information that characterizes the object is detected from the captured image of the object. Control points and movement information of the control points are set for the captured image in accordance with (i) the detected characteristic information and (ii) an arrangement pattern and a movement pattern each corresponding to the predetermined type of transformation. Meanwhile, grid points are set regardless of the control points. Then, movement information of the set grid points is set in accordance with the control points and the movement information of the control points. An image area which is a quadrangle whose four vertices are grid points of the grid points is transformed in accordance with the set movement information of the grid points. The captured image of the object is thus transformed.

As described above, according to the present invention, grid points which are used for image transformation is set independently of control points which are provided in accordance with characteristic information of an image. According to this, even if the control points are provided to incline in accordance with an inclination of an object in a captured image, it is unnecessary that the grid points be provided to incline. It is also unnecessary that an image area which is a quadrangle whose four vertices are grid points of the grid points be provided to incline. Therefore, it is possible to easily determine in which of the image areas a pixel of the image is included. This reduces a processing load.

Note that it is only necessary that the movement amount of the control points for the image transformation be determined by (i) generating a movement amount vector distribution model of the object by, for example, learning in advance in what amount each of the control points is preferably moved and (ii) fitting the generated model to a characteristic point of the object. Alternatively, the movement amount of the control points may be manually set by a user, so as to be stored.

It is only necessary that the movement amount of the grid points for the image transformation be found by carrying out a commonly used interpolation process such as cubic B-spline function by use of information as to the movement amount of the control points. Normally, it is desirable to use high-order interpolation. Alternatively, in a case where a movement amount vector distribution model is generated as in the case of the control points, it is possible to linearly find the movement amount of the grid points from a relationship between the movement amount of the control points and a movement amount of the model.

Advantageous Effects of Invention

As described above, the image transforming device in accordance with the present invention is arranged such that grid points which are used for image transformation are set independently of control points which are provided in accordance with characteristic information of an image. According to this, even if the control points are provided to incline in accordance with an inclination of an object in a captured image, it is unnecessary that the grid points be provided to incline. It is also unnecessary that an image area which is a quadrangle whose four vertices are grid points of the grid points be provided to incline. Therefore, it is possible to easily determine in which image area a pixel of the image included. This yields an effect of reducing a processing load.

DESCRIPTION OF EMBODIMENTS

Figure 1:
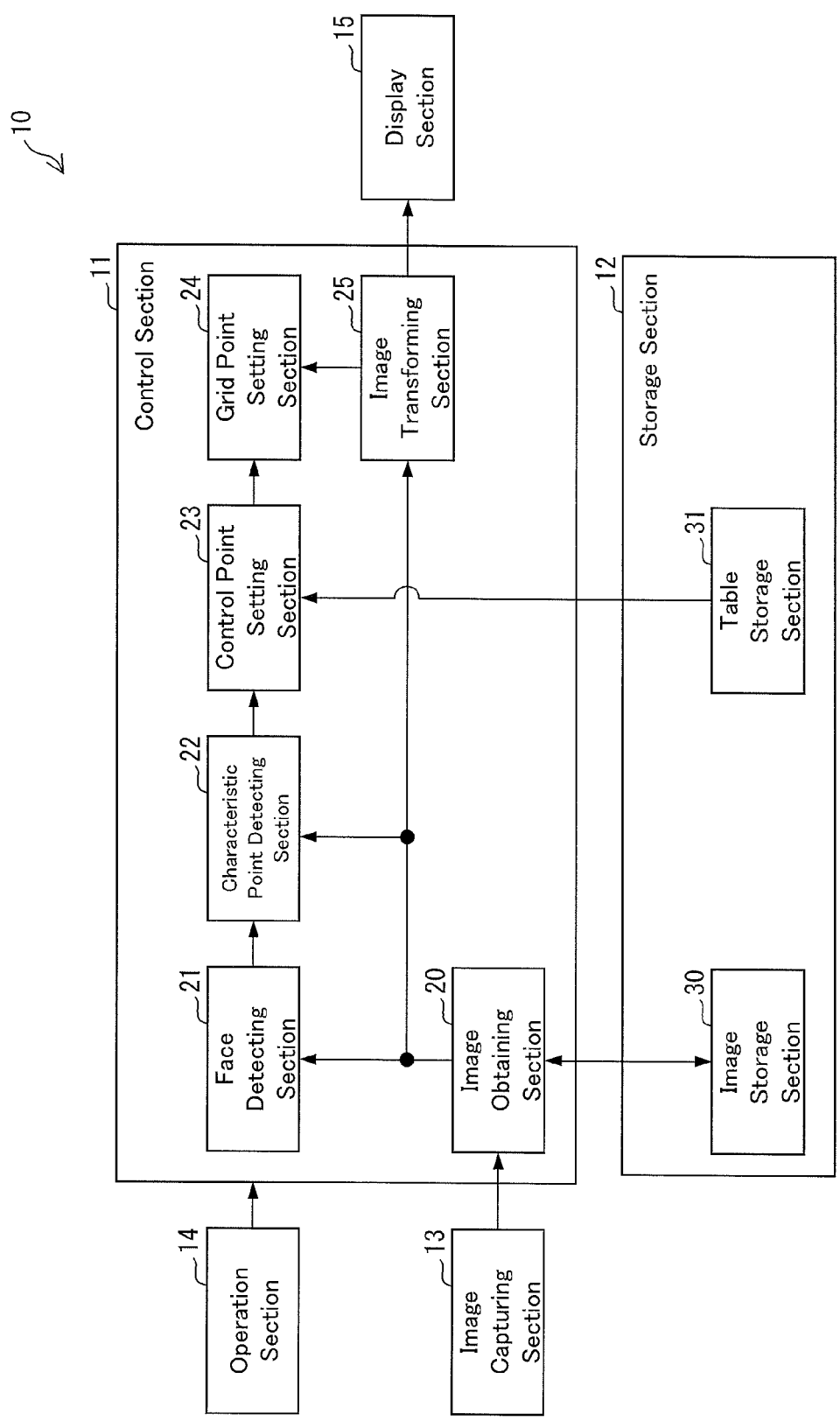
FIG. 1 is a block diagram schematically showing an arrangement of a digital camera which is an embodiment of the present invention.

The following description discusses an embodiment of the present invention with reference to FIGS. 1 to 12. FIG. 1 schematically shows an arrangement of a digital camera which is an embodiment of the present invention. A digital camera (an electronic device) 10 includes a control section (an image transforming device) 11, a storage section 12, an image capturing section 13, an operation section 14, and a display section 15 (see FIG. 1).

The control section 11 integrally controls operation of various sections and members of the digital camera 10. The control section 11 is constituted by a computer which includes, for example, a CPU (Central Processing Unit) and a memory. The operation of various sections and members is controlled by causing the computer to execute a control program. The control program may be a program used by reading what is recorded in a removable medium such as a flash memory or may be a program used by reading what is installed in a hard disk or the like. Alternatively, the control program may be downloaded and installed in a hard disk or the like so as to be executed. Note that the control section 11 is specifically discussed later.

The storage section 12 is constituted by a nonvolatile storage device such as a flash memory or a ROM (Read Only Memory) and a volatile storage device such as a RAM (Random Access Memory). The nonvolatile storage device stores, for example, the control program, an OS (operating system) program, other various programs, and data of a captured image (described later). Meanwhile, the volatile storage device stores a work file, a temporary file, and the like. Note that the storage section 12 is specifically described later.

The image capturing section 13 captures an image of a subject. The image capturing section 13 includes (i) optical systems such as a lens group, an aperture, and an image sensor and (ii) circuit systems such as an amplifier and an A/D converter. The image sensor is exemplified by a CCD image sensor and a CMOS (Complementary Metal-oxide Semiconductor) image sensor. The image capturing section 13 generates a captured image by capturing an image of a subject, converts the captured image into data of the captured image, and transmits the data to the control section 11.

The operation section 14 receives various inputs from a user by an operation of the user. The operation section 14 is constituted by an input button, a touch panel, and other input devices. The operation section 14 converts, into operation data, information operated by the user, and transmits the operation data to the control section 11. Note that examples of the other input devices include a keyboard, a numeric keypad, and a pointing device such as a mouse.

The display section 15 displays various pieces of information such as a letter and an image in accordance with image data which is supplied from the control section 11. The display section 15 is constituted by display devices such as an LCD (liquid crystal diode), a CRT (cathode ray tube), and a plasma display.

The present embodiment carries out a so-called smaller face transformation such that a facial contour, especially a vicinity of a chin of a face looking to the front is transformed so that the face looks slimmer and smaller. Each of FIGS. 2 through 7 shows an outline of the smaller face transformation in accordance with the present embodiment.

Figure 2:
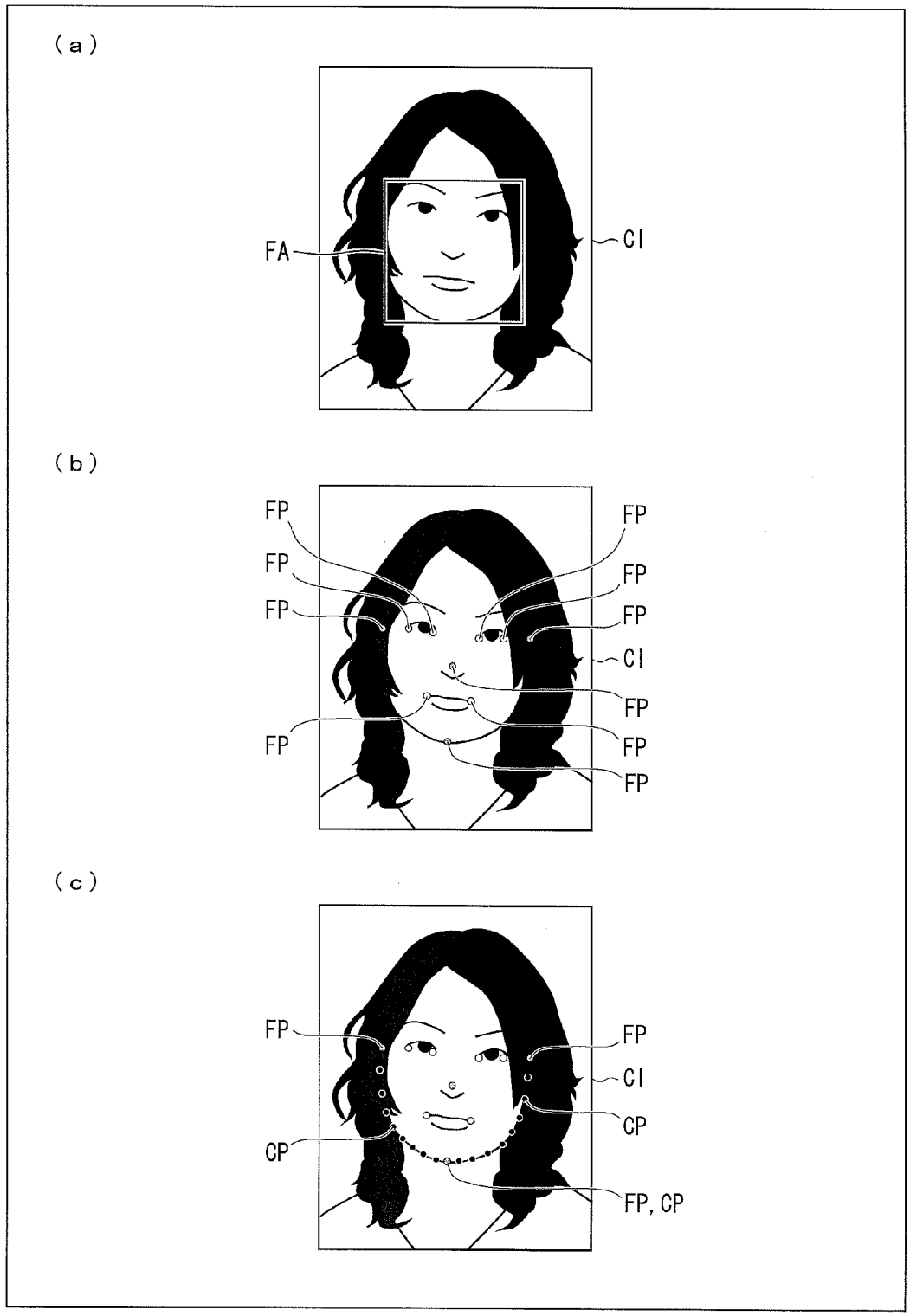
FIG. 2 shows an outline of a smaller face transformation in accordance with the embodiment.

First, a facial area FA in a captured image CI is detected, the captured image CI having been obtained from the image capturing section 13 or the storage section 12 (see (a) of FIG. 2). In (a) of FIG. 2, the facial area FA is a black-framed area.

Next, facial characteristic points (characteristic information) FP are detected from the detected facial area FA (see (b) of FIG. 2). Note that the facial characteristic points FP include facial organ points characterizing facial organs such as eyes, a mouth, and a nose. A facial organ point of the eyes is exemplified by inner canthi, outer canthi, and central points of the eyes. A facial organ point of the mouth is exemplified by edges of the mouth and a central point of the mouth. A facial organ point of the nose is exemplified by a central point of the nose. Note that it is unnecessary to detect all the facial characteristic points and it is only necessary to detect a facial characteristic point FP which is relevant to the smaller face transformation. According to an example shown in (b) of FIG. 2, inner canthi, outer canthi, edges of a mouth, a central point of a face, an edge of a chin, and temples are detected as the facial characteristic points FP.

Subsequently, control points CP are provided in the captured image CI in accordance with the detected facial characteristic points FP (see (c) of FIG. 2). Specifically, the control points CP are provided on a facial contour in an area of the captured image CI which area is to be transformed (e.g., a face, a nose, and a mouth). It is only necessary that an example of the smaller face transformation assume a bottom of a chin, temples, a jaw line, and the like to be the control points CP. Note that some of the facial characteristic points FP may be the control points CP. According to an example shown in (c) of FIG. 2, the control points CP are provided on the facial contour from the chin to the temples which facial contour is to be subjected to the smaller face transformation.

According to the example shown in (c) of FIG. 2, a facial characteristic point FP at an edge of the chin is a control point CP.

Note that an arrangement pattern in which the control points CP are provided is set in advance in accordance with a type of transformation. Note also that the control points CP are provided by (i) detecting a target contour line, (ii) generating a contour line model, or (iii) the like.

Figure 3:
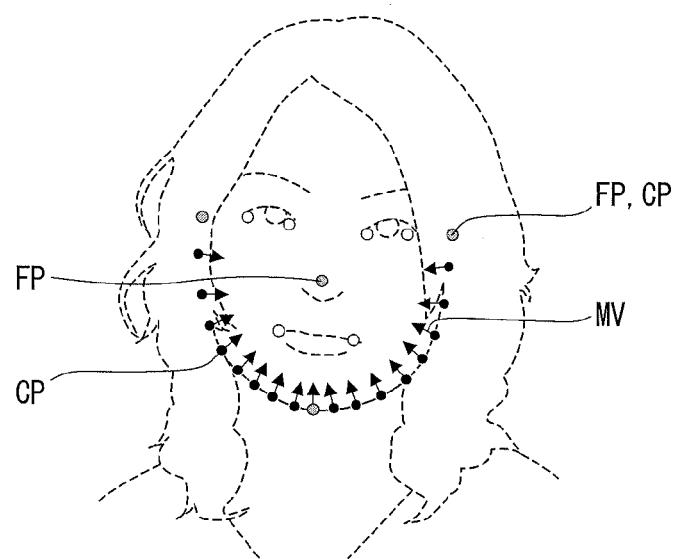
FIG. 3 shows the outline of the smaller face transformation.

Next, a movement amount of and a movement direction which are necessary for the smaller face transformation are determined for each of provided control points CP (see FIG. 3). For example, the movement amount and the movement direction can be determined by fitting a movement amount table to the provided control points CP.

According to an example shown in FIG. 3, the determined movement amount and the determined movement direction are indicated by a movement amount vector (movement information of control points) MV. The movement amount vector MV of each of the control points CP is proportional to a vector from the each of the control points CP to a facial characteristic point FP at a central point of a face (a top of a nose), and a proportionality constant is set for the each of the control points CP so as to be suitable for the smaller face transformation. According to the example shown in FIG. 3, control points CP on both sides of the face are set to have respective large proportionality constants, i.e., respective large movement amounts. In contrast, control points CP on a lower side of the face are set to have respective small proportionality constants, i.e., respective small movement amounts.

Figure 4:
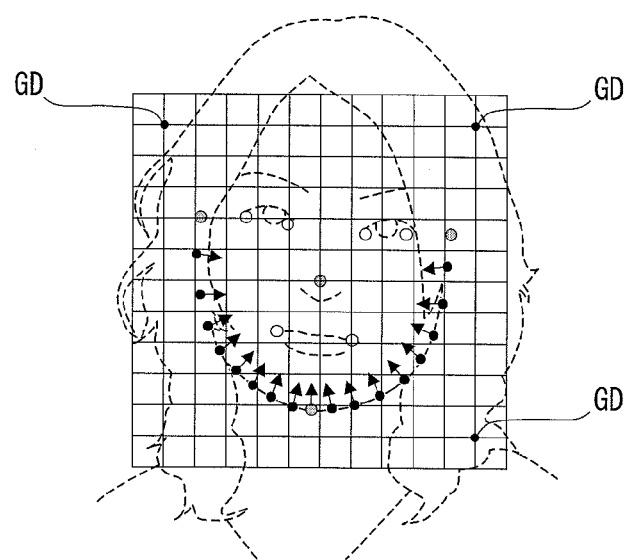
FIG. 4 shows the outline of the smaller face transformation.

Subsequently, besides the control points CP, grid points GD are set in an area which at least includes an area to be transformed (see FIG. 4). Note that it is desirable to set a grid point GD so that each side of a grid which is defined by grid points GD is parallel to one of two coordinate axes used for showing a location of a pixel (the two coordinate axes refer to a vertical axis and a horizontal axis of coordinates used for showing a location of each of pixels included in an image). In this case, it is possible to easily determine in which of image areas each of which has four vertices that are four grid points GD each pixel is included.

Figure 5:
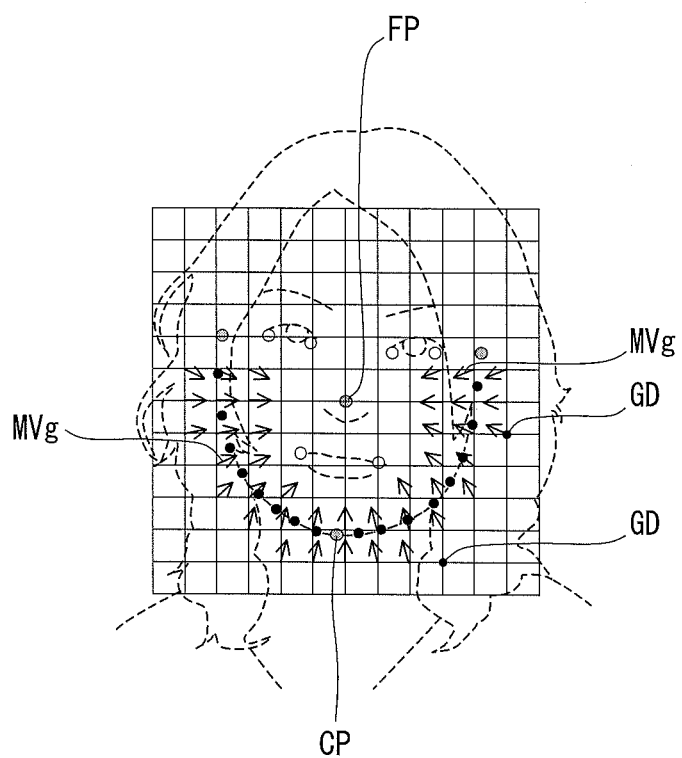
FIG. 5 shows the outline of the smaller face transformation.

Next, a movement amount of and a movement direction of grid points GD are found in accordance with the movement amount vector MV of control points CP (see FIG. 5). According to an example shown in FIG. 5, the movement amount and the movement direction which have been thus found are indicated by a movement amount vector (movement information of a grid point) MVg.

As in the case of the movement direction of each of the control points CP, a movement direction of each of the grid points GD is a direction from the each of the grid points GD to a facial characteristic point FP which is provided at a central point of a face. Meanwhile, a movement amount of each of the grid points GD can be found by using high-order interpolation (e.g., cubic B-spline function) in accordance with a distribution of the movement amount vector MV of a control point CP in a vicinity of the each of the grid points GD. For example, assuming that a distance between adjacent grid points GD is one (1), the movement amount is found based on a distance between the each of the grid points GD and the control point CP.

Figure 6:
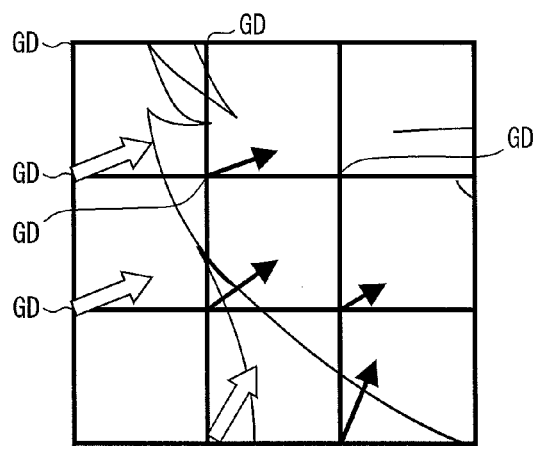
FIG. 6 shows the outline of the smaller face transformation.
Figure 6:
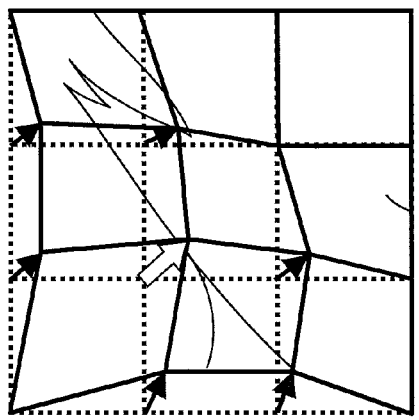
Figure 7:
FIG. 7 shows the outline of the smaller face transformation.

An image area whose four vertices are four grid points GD (see (a) of FIG. 6) is transformed in accordance with a movement amount of and a movement direction of each of the four grid points GD (see (b) of FIG. 6). This prepares a captured image CI' which has been subjected to the smaller face transformation, and the captured image CI' is displayed via the display section 15. Note that a movement amount of and a movement direction of each pixel in the image area can be found by use of interpolation in accordance with the movement amount of and the movement direction of the each of the four grid points GD.

Note that, in a case where the movement amount of the each of the four grid points GD is not more than a predetermined value, it is desirable to skip transformation of the image area whose four vertices are the four grid points GD. In this case, it is possible to subject fewer image areas to a transformation process. This enables a higher-speed image transformation process.

In a case where a movement amount or a luminance difference of any of the four grid points GD is not less than the predetermined value, it is desirable to find a movement amount of and a movement direction of the each of the pixels in the image area. In this case, transformation of an image in the image area with high accuracy can prevent a deterioration in image quality due to image transformation.

According to this, the digital camera 10 of the present embodiment is arranged such that grid points GD which are used for image transformation are set independently of control points CP which are provided in accordance with characteristic information of an image. According to this, even if the control points CP are provided to incline in accordance with an inclination of a face in the captured image CI, it is unnecessary that the grid points GD be provided to incline. It is also unnecessary that an image area which is a quadrangle whose four vertices are the grid points GD be provided to incline. Therefore, it is possible to easily determine in which of the image areas a pixel of the image is provided. This reduces a processing load.

The following description specifically discusses the control section 11 and the storage section 12. The control section 11 includes an image obtaining section (obtaining means) 20, a face detecting section 21, a characteristic point detecting section (detecting means) 22, a control point setting section (control point setting means) 23, a grid point setting section (grid point setting means) 24, and an image transforming section (image transforming means) 25. The storage section 12 includes an image storage section 30 which stores data of a captured image and a table storage section 31 which stores a movement amount vector distribution table (an arrangement pattern, a movement pattern).

The image obtaining section 20 obtains data from the image capturing section 13 as to a captured image CI. The image obtaining section 20 stores the obtained data of the captured image CI in the image storage section 30. According to the present embodiment, the image obtaining section 20 transmits, to each of the face detecting section 21 and the characteristic point detecting section 22, the data of the captured image CI which data has been obtained from the image capturing section 13 or from the image storage section 30.

The face detecting section 21 detects a facial area FA from the captured image CI by using the data from the image obtaining section 20 as to the captured image CI ((a) of FIG. 2). The face detecting section 21 transmits positional information of the detected facial area FA to the characteristic point detecting section 22. Note that the facial area FA can be detected by using a publicly-known technique, e.g., by using template matching, detecting a skin-colored area, or detecting a facial contour.

The characteristic point detecting section 22 detects facial characteristic points FP by using the data from the image obtaining section 20 as to the captured image CI and the positional information from the face detecting section 21 as to the facial area FA ((b) of FIG. 2). The characteristic point detecting section 22 transmits positional information of the detected facial characteristic points FP to the control point setting section 23. Note that the facial characteristic points FP can be detected by using a publicly-known technique, e.g., by extracting an edge.

The control point setting section 23 sets control points CP in accordance with the positional information from the characteristic point detecting section 22 as to the detected facial characteristic points FP ((c) of FIG. 2). The control point setting section 23 also sets, for each of the set control points CP, a movement amount of and a movement direction which are necessary for the smaller face transformation (FIG. 3). The control point setting section 23 transmits, to the grid point setting section 24, positional information of the set control points CP, the set movement amount, and the set movement direction.

The following description specifically describes, with reference to FIGS. 8 to 11, how the movement amount and the movement direction are set. According to the present embodiment, the control point setting section 23 sets the movement amount and the movement direction by use of the movement amount vector distribution table which is stored in the table storage section 31.

The movement amount vector distribution table is generated in accordance with a movement amount vector distribution model for an object. The movement amount vector distribution model defines in advance in what amount each of the control points CP is preferably moved. According to the movement amount vector distribution table, a movement direction is set in advance so that a facial contour moves toward a center of a face.

Figure 8:
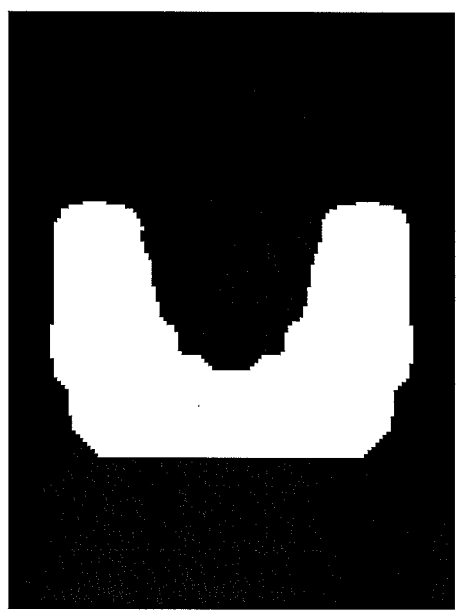
FIG. 8 shows existence or nonexistence of a movement amount vector distribution table which is stored in a storage section of the digital camera.

FIG. 8 shows existence or nonexistence of the movement amount vector distribution table for a facial image. In FIG. 8, a black-colored area is an area in which the movement amount is 0 (zero) and no movement amount vector exists. Meanwhile, a white-colored area is an area in which the movement amount is not 0 (zero) and a movement amount vector exists. The movement amount vector exists in a vicinity of a chin of the facial image (see FIG. 8). Therefore, the movement amount vector distribution table defines a degree of transformation in the vicinity of the chin in the facial image.

The movement amount vector distribution table, in which a positional relationship with a characteristic point of a facial image (e.g., temples and a bottom of a chin) is determined, is resized and rotated so as to match a detected facial area FA. The movement amount vector distribution table is resized as described later. Note that the movement amount vector distribution table contains (i) a table which shows a movement amount in an x-axis direction and (ii) a table which shows a movement amount in a y-axis direction. The following description discusses the table which shows the movement amount in the x-axis direction, and the same applies to the table which shows the movement amount in the y-axis direction.

Figure 9:
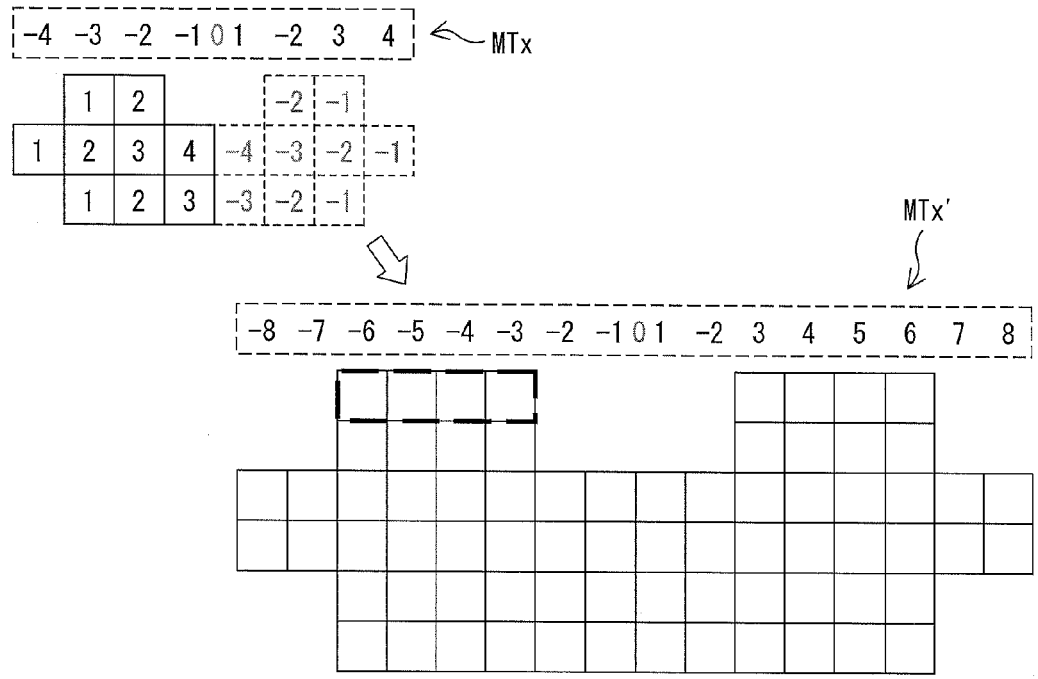
FIG. 9 shows an example of a table which is contained in the movement amount vector distribution table and shows a movement amount in an x-axis direction.
Figure 10:
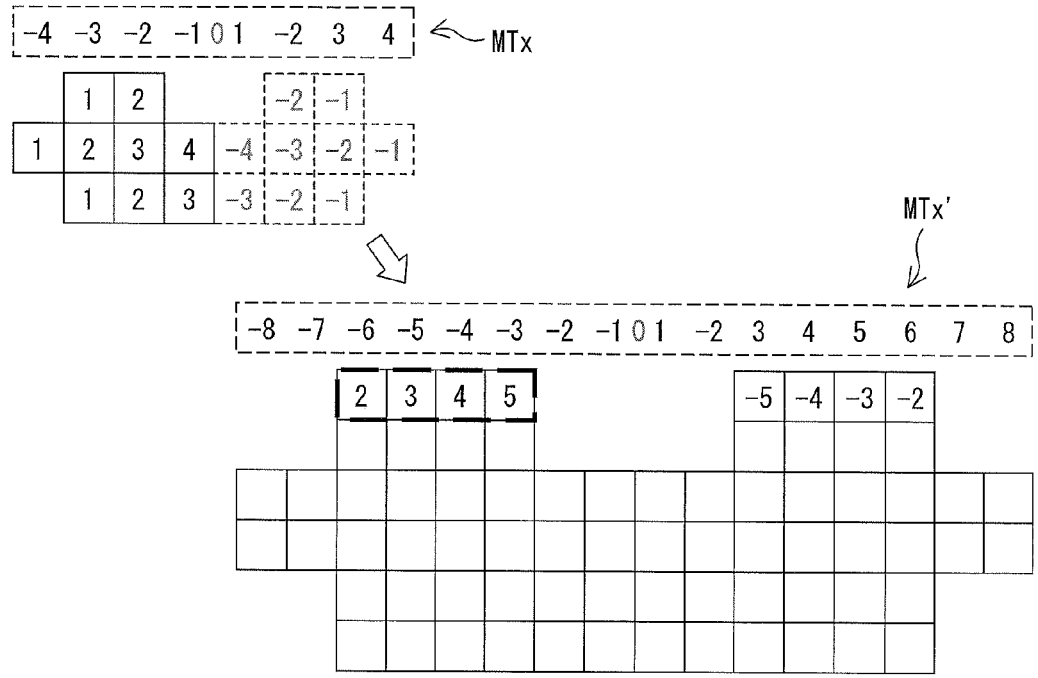
FIG. 10 shows an example of the table which shows the movement amount in the x-axis direction.
Figure 11:
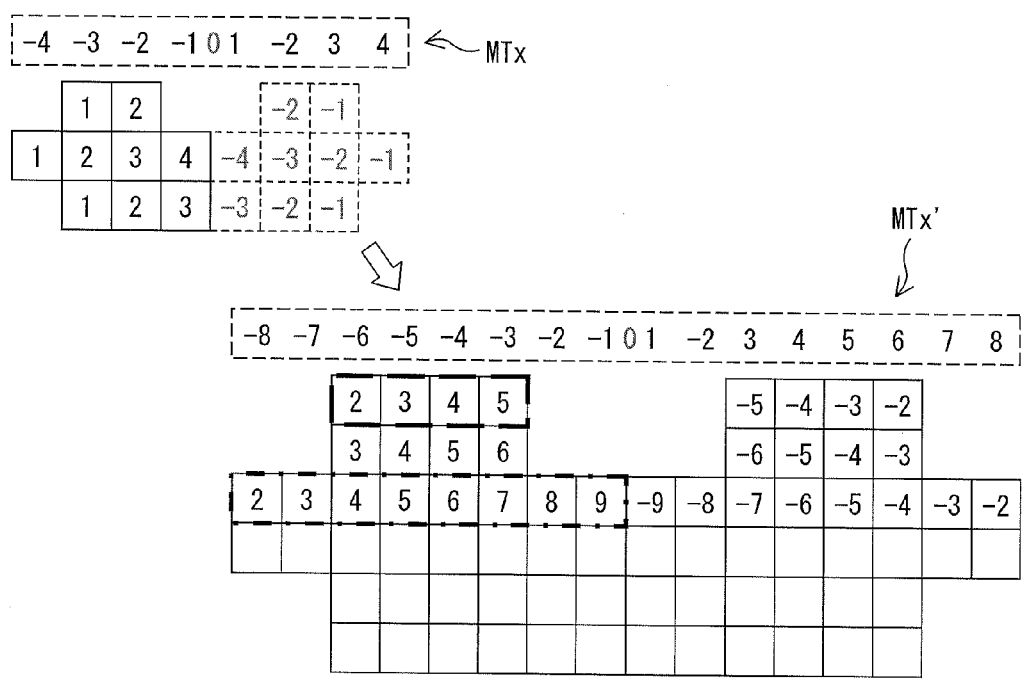
FIG. 11 shows an example of the table which shows the movement amount in the x-axis direction.

Each of FIGS. 9 to 11 shows an example of a table which is contained in the movement amount vector distribution table and shows the movement amount in the x-axis direction. In each of FIGS. 9 to 11, a table MTx which has not been resized is shown on the upper left side, and a table MTx' obtained by resizing the table MTx is shown on the lower side. An x coordinate uses a relative coordinate whose bilateral symmetry axis is 0.

Note that a face is substantially in bilateral symmetry. Therefore, the table MTx actually contains data in one of a left area and a right area of the white-colored area shown in FIG.

8 (see FIGS. 9 to 11). Data contained in the other of the left area and the right area is found when the table MTx is actually used.

Data values are read sequentially from the first row of the table MTx. Then, the data values are written to the table MTx' obtained by resizing the table MTx. In this case, a coordinate value to be written to the table MTx' obtained after the resizing is a value obtained by converting, into an integer, a value obtained by multiplying an x coordinate of the original table MTx by n (n≠0). Identical values are copied to coordinates which are in bilateral symmetry. However, in case of the movement amount in the x-axis direction (see FIG. 9), signs of the values are reversed. In case of n-fold resizing of the table MTx in the x-axis direction, a data value is accordingly multiplied by n.

In a case where the table MTx is enlarged, coordinates to which no data values have been written exist after the data values in the first row have been written to the table MTx'. In this case, it is only necessary to fill such coordinates with data values obtained by linear interpolation by using the data values which have been written to the table MTx'. FIG. 10 shows a state in which the writing of the data values in the first row has been completed in the table MTx'.

It is only necessary to repeat a similar process for the second and later rows of the table MTx. Note that, in a case where the table MTx is enlarged, a certain line to which no data values have been written occurs. In this case, it is only necessary to fill the certain line with data values obtained by linear interpolation by using data values which have been written to a line followed by or following the certain line. FIG. 11 shows a state in which writing of data values in the first to third rows has been completed in the table MTx' by using data values in the first and second rows of the table MTx. It is only necessary that a movement amount vector of each of the control points CP be thus found.

The grid point setting section 24 divides an area of a facial image in a grid pattern regardless of control points CP, and sets grid points GD (see FIG. 1). For example, assuming that a center of a face is an origin, it is only necessary to divide the area of the facial image by (2N+1) straight lines x=l×M (l is an integer from −N to N) each being parallel to a y-axis and (2N+1) straight lines y=m×M (m is an integer from −N to N) each being parallel to an x-axis. Note that M indicates the number of pixels which exists between adjacent straight lines.

The grid point setting section 24 also finds a movement amount of and a movement direction of each of the grid points GD in accordance with positional information from the control point setting section 23 as to each of the control points CP, and a movement amount and a movement direction (actually, a movement amount in an x-axis direction and a movement amount in a y-axis direction) from the control point setting section 23 as to each of the control points CP. The grid point setting section 24 transmits, to the image transforming section 25, positional information of, and the movement amount of and the movement direction of each of the grid points GD.

In accordance with the positional information of, and the movement amount of and the movement direction of the each of the grid points GD, the positional information, the movement amount and the movement direction each having been transmitted from the grid point setting section 24, the image transforming section 25 transforms an image area which is obtained by dividing an area of a facial image in a grid pattern, i.e., an image area whose four vertices are four grid points GD, so as to transform a captured image. The image transforming section 25 controls the display section 15 to display the transformed captured image.

Note that it is desirable to set the following three requirements and cause the image transforming section 25 to change a process in accordance with which of the following three requirements is met. The three requirements are:

a first requirement: a maximum value of magnitude of respective movement amount vectors of respective four grid points GD in an image area is less than a first predetermined value;

a second requirement: the maximum value of the magnitude of the respective movement amount vectors of the respective four grid points GD is not less than the first predetermined value and is less than a second predetermined value; and a third requirement: the maximum value of the magnitude of the respective movement amount vectors of the respective four grid points GD is not less than the second predetermined value.

An image area which meets the first requirement is small in movement amount of each of the grid points GD. The image area seems to be distant from a facial contour, and pixels in the image area are all small in movement amount. Consequently, in the image area, there seems to be hardly any difference between an image which has not been transformed and an image which has been transformed. Therefore, the image transforming section 25 skips an image transformation process in the image area which meets the first requirement. This enables a higher-speed image transformation process.

An image area which meets the second requirement is slightly distant from a facial contour. However, it is desirable to carry out image transformation with respect to the image area so as not to feel uncomfortable with a transformed image. Note, however, that the image transformation is carried out by linear interpolation, which seems to less seriously affect an image quality of a transformed image.

An image area which meets the third requirement is located in a vicinity of a facial contour and is expected to be transformed to the greatest degree. Therefore, since image transformation carried out by linear interpolation may cause a transformed image to be unnatural, image transformation is carried out by high-order interpolation. Such a process allows an image transformation process to be carried out at a higher speed while reducing a deterioration in image quality due to image transformation.

Note that according to the present embodiment, although each of the three requirements uses the maximum value of the magnitude of the respective movement amount vectors of the respective four grid points GD, any statistic such as a minimum value and an average value is usable.

Figure 12:
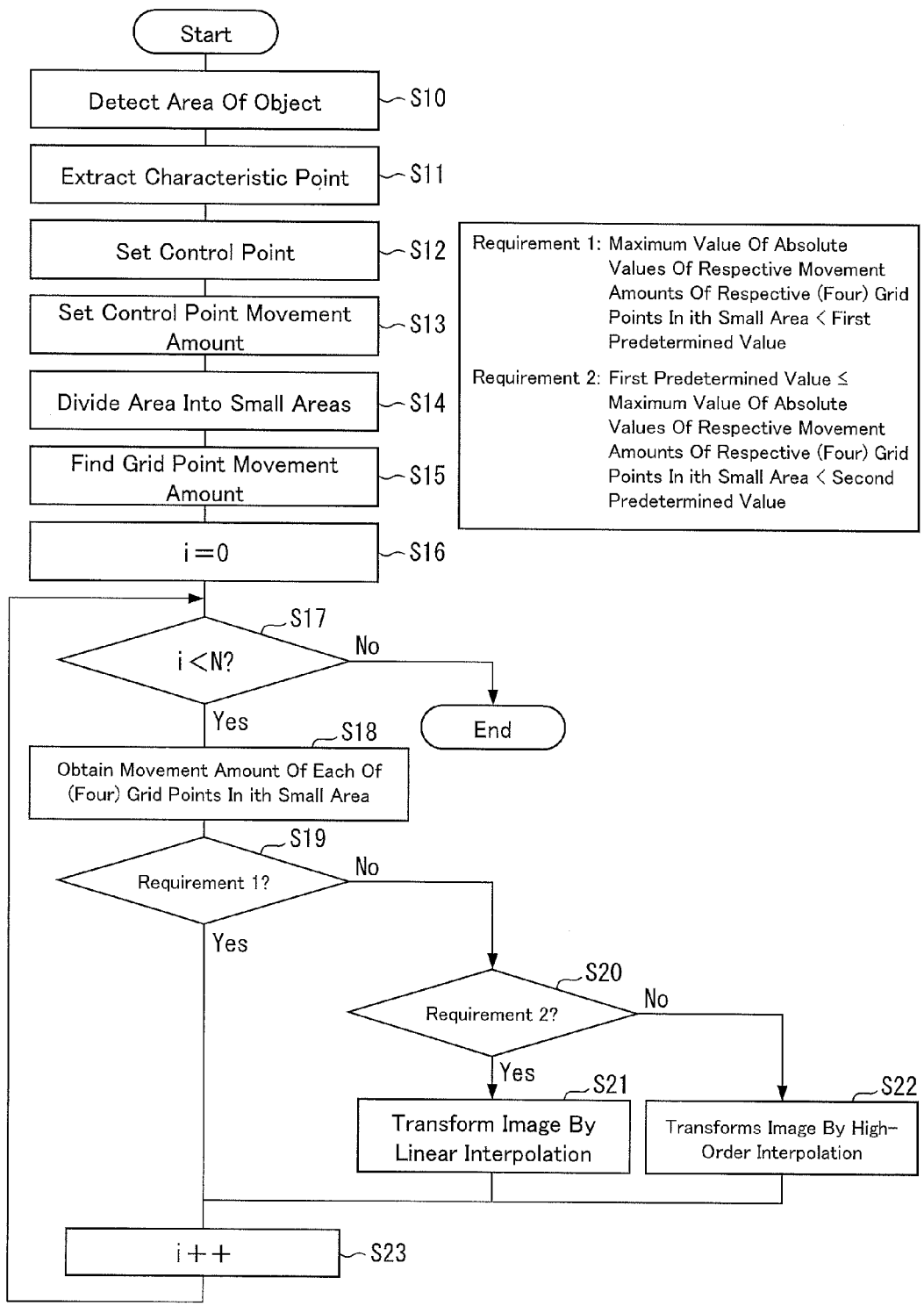
FIG. 12 is a flowchart showing how the digital camera carries out an image transformation process.

FIG. 12 shows how the digital camera 10 having the arrangement carries out an image transformation process. The face detecting section 21 detects a facial (object) area FA by use of a captured image CI obtained by the image obtaining section 20 (S10), and the characteristic point detecting section 22 detects a facial characteristic point FP in accordance with the detected facial area FA (S11) (see FIG. 12).

Next, in accordance with the detected facial characteristic point FP, the control point setting section 23 sets control points CP (S12), and sets a movement amount (vector) of each of the control points CP (S13). Then, the grid point setting section 24 divides an area of a facial image into small areas in a grid pattern (S14), and finds a movement amount (vector) of each of grid points GD in accordance with the set control points CP and the set movement amount of each of the control points CP (S15).

Subsequently, the image transforming section 25 resets an integer i to 0 (S16), and repeats the following process until the integer i exceeds the number Ns of the small areas (S17). That is, the image transforming section 25 obtains movement amounts (vectors) of respective four grid points GD in an ith small area (S18). In a case where a maximum value of absolute values of the respective obtained movement amounts (vectors) is less than a first predetermined value (YES at S19), the image transforming section 25 skips a process of image transformation, and the image transformation process proceeds to S23.

In a case where the maximum of the absolute values of the respective obtained movement amounts (vectors) is not less than the first predetermined value and is less than a second predetermined value (NO at S19 and YES at S20), the image transforming section 25 carries out image transformation by linear interpolation (S21), and the image transformation process proceeds to S23. In a case where the maximum value of the absolute values of the respective obtained movement amounts (vectors) is not less than the second predetermined value (NO at S19 and NO at S29), the image transforming section 25 carries out image transformation by high-order interpolation (S22), and the image transformation process proceeds to S23. At S23, the integer i is incremented by one (1). Then, the image transformation process returns to S17.

The present invention is not limited to the description of the embodiments above, but may be altered by a skilled person within the scope of the claims. An embodiment based on a proper combination of technical means disclosed in different embodiments is encompassed in the technical scope of the present invention.

For example, according to the present embodiment, the present invention is applied to transformation of an image of a human face. Alternatively, the present invention is applicable to transformation of an image of any object provided that the object has a particular shape and a characteristic point characterizing the particular shape is extractable. Such an object is exemplified by human organs (e.g., eyes, a nose and a mouse), a human whole body, an animal, and a pot.

According to the present embodiment, the present invention is applied to a digital camera. Alternatively, the present invention is applicable to any electronic device that has an image capturing function such as a camera mobile phone and a PC provided with a camera. The present invention is also applicable to any electronic device that has no image capturing function but has a function of obtaining data of a captured image via wire communication, wireless communication, a communication network, or a removable recording medium. The present invention, which enables a lighter processing load than a conventional technique, is particularly suitable for a small-sized electronic device.

Each block included in the digital camera 10, especially the control section 11, may be realized by means of hardware. Alternatively, the each block may be realized by a CPU by means of software as described later.

Namely, the digital camera 10 includes (i) a CPU which executes a command of a control program that implements each function of the digital camera 10, (ii) a ROM in which the control program is stored, (iii) a RAM (random access memory) which extracts the control program, (iv) a storage device (a recording medium) such as a memory in which the control program and various sets of data are stored, and the like. The object of the present invention can also be achieved by (i) supplying, to the digital camera 10, a recording medium in which program codes (an executable program, an intermediate code program, and a source program) of a control program of the digital camera 10, the control program being software that implements the each function, are computer-readably recorded, and (ii) causing the computer (or a CPU or an MPU) to read and carry out the program codes recorded in the recording medium.

Examples of the recording medium include (i) tapes such as a magnetic tape and a cassette tape, (ii) disks including magnetic disks such as a floppy (Registered Trademark) disk and a hard disk, and optical disks such as a CD-ROM, an MO, an MD, a DVD, and a CD-R, (iii) cards such as an IC card (including a memory card) and an optical card, (iv) semiconductor memories realized by a mask ROM, EPROM, EEPROM, a flash ROM, and (v) the like.

In addition, the digital camera 10 may be arranged to be connectable to a communication network, so as to supply thereto the program codes via a communication network. The communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of the communication network is not limited to a transmission medium of a specific type or form. Examples of the transmission medium includes wired transmission media such as IEEE1394, a USB, a power-line carrier, a cable TV circuit, a telephone line, and ADSL and wireless transmission media such as infrared communication systems such as IrDA and a remote controller, Bluetooth (Registered Trademark), 802.11 wireless communication system, HDR, a mobile phone network, a satellite circuit, and a digital terrestrial network.

As described earlier, in order to attain the object, an image transforming device in accordance with the present embodiment which transforms at least a part of a captured image of an object based on a predetermined type of transformation, the image transforming device includes: obtaining means for obtaining the captured image of the object; detecting means for detecting characteristic information from the captured image of the object, the characteristic information characterizing the object, the captured image having been obtained by the obtaining means; control point setting means for setting control points and movement information of the control points for the captured image, based on the characteristic information detected by the detecting means and on an arrangement pattern and a movement pattern each corresponding to the predetermined type of transformation; grid point setting means for setting grid points for the captured image, and setting movement information of the grid points based on the control points and the movement information of the control points, the control points and the movement information each having been set by the control point setting means; and image transforming means for transforming an image area by moving the grid points based on the movement information of the grid points which movement information has been set by the grid point setting means, the image area being a quadrangle, the grid points being four vertices of the quadrangle.

In order to attain the object, an image transforming method in accordance with the present embodiment for transforming at least a part of a captured image of an object based on a predetermined type of transformation, the image transforming method includes the steps of: (a) obtaining the captured image of the object; (b) detecting characteristic information from the captured image of the object, the characteristic information characterizing the object, the captured image having been obtained in the step (a); (c) setting control points and movement information of the control points for the captured image, based on the characteristic information detected in the step (b) and on an arrangement pattern and a movement pattern each corresponding to the predetermined type of transformation; (d) setting grid points for the captured image, and setting movement information of the grid points based on the control points and the movement information of the control points, the control points and the movement information each having been set in the step (c); and (e) transforming an image area by moving the grid points based on the movement information of the grid points which movement information has been set in the step (d), the image area being a quadrangle, the grid points being four vertices of the quadrangle.

Note here that the predetermined type of transformation is exemplified by a smaller face transformation. In case of a facial image, examples of the characteristic information include outer canthi, inner canthi, edges of a mouth, a central point of a face, an edge of a chin, and temples.

According to the arrangement and the method, when a captured image of the object is obtained, characteristic information that characterizes the object is detected from the captured image of the object. Control points and movement information of the control points are set for the captured image in accordance with (i) the detected characteristic information and (ii) an arrangement pattern and a movement pattern each corresponding to the predetermined type of transformation. Meanwhile, grid points are set regardless of the control points. Then, movement information of the set grid points is set in accordance with the control points and the movement information of the control points. An image area which is a quadrangle whose four vertices are grid points of the grid points is transformed in accordance with the set movement information of the grid points. The captured image of the object is thus transformed.

As described above, according to the present embodiment, grid points which is used for image transformation is set independently of control points which is provided in accordance with characteristic information of an image. According to this, even if the control points are provided to incline in accordance with an inclination of an object in a captured image, it is unnecessary that the grid points be provided to incline. It is also unnecessary that an image area which is a quadrangle whose four vertices are grid points of the grid points be provided to incline. Therefore, it is possible to easily determine in which of the image areas a pixel of the image is provided. This reduces a processing load.

Note that the movement amount of the control points for the image transformation may be determined by (i) generating a movement amount vector distribution model of the object by, for example, learning in advance in what amount each of the control points is preferably moved and (ii) fitting the generated model to a characteristic point of the object. Alternatively, the movement amount of the control points may be manually set by a user, so as to be stored.

The movement amount of the grid points for the image transformation may be found by carrying out a commonly used interpolation process such as cubic B-spline function by use of information as to the movement amount of the control points. Normally, it is desirable to use high-order interpolation. Alternatively, in a case where a movement amount vector distribution model is generated as in the case of the control points, it is possible to linearly find the movement amount of the grid points from a relationship between the movement amount of the control points and a movement amount of the model.

Commonly, in a process for transforming an object in an image, all pixels in an area to be transformed are to be moved. This means that processing time increases in proportion to the number of pixels in the area to be transformed. For example, assuming that processing time for a 0.3-million-pixel image (640 pixels×480 lines) is one second, processing time for a 2-million-pixel image (1600 pixels×1200 lines) is 6.25 seconds, a 5-million-pixel image (2560 pixels×1920 lines) is 16 seconds, and a 12-million-pixel image (4000 pixels×3000 lines) is 39 seconds. Such processing time seems to be unpractical. Therefore, it is desired that practical processing time be maintained even if the number of pixels increases.

Therefore, the image transforming device in accordance with the present embodiment is preferably arranged such that the image transforming means does not transform the image area when a statistic of a movement amount of the grid points provided in an image area to be transformed is less than a first predetermined value.

In this case, it is possible to carry out an image transformation process at a higher speed and in a shorter processing time. Note that it is desirable to set the first predetermined value to an upper limit value of the statistic at which the image area is transformed but a difference between an image which has not been transformed and an image which has been transformed is hardly visible. In this case, even if transformation of the image area is skipped, an image quality of a transformed image is little affected. Note that the statistic is exemplified by a maximum value, a minimum value, and an average value.

The image transforming device in accordance with the present embodiment is preferably arranged such that the image transforming unit transforms the image area by linear interpolation when the statistic of the movement amount of the grid points is not less than the first predetermined value and is less than a second predetermined value; and the image transforming unit transforms the image area by high-order interpolation when the statistic of the movement amount of the grid points is not less than the second predetermined value.

In this case, using linear interpolation instead of high-order interpolation makes it possible to carry out an image transformation process at a much higher speed and in a much shorter processing time. Note that it is desirable to set the second predetermined value to an upper limit value of the statistic at which a difference between an image which has not been transformed and an image which has been transformed is visible but an image quality is less affected. In this case, even if the image area is transformed by linear interpolation, an image quality of a transformed image is little affected.

Note that an electronic device including the image transforming device having the arrangement can also yield an operation effect described earlier. Note also that it is possible to cause a computer to carry out each of the steps of the image transforming method by use of an image transforming program. Moreover, it is possible to execute the image transforming program on any computer by causing a computer-readable recording medium to store the image transforming program.

Industrial Applicability

As described above, the image transforming device in accordance with the present invention is arranged such that grid points which are used for image transformation are set independently of control points which are provided in accordance with characteristic information of an image. According to this, even if the control points are provided to incline in accordance with an inclination of an object in a captured image, it is unnecessary that the grid points be provided to incline. It is also unnecessary that an image area which is a quadrangle whose four vertices are grid points of the grid points be provided to incline. Therefore, the image transforming device in accordance with the present invention is applicable to any electronic device that is capable of obtaining a captured image.

REFERENCE SIGNS LIST

10 Digital camera (Electronic device)
11 Control section (Image transforming device)
12 Storage section
13 Image capturing section
14 Operation section
15 Display section
20 Image obtaining section (Image obtaining means)
21 Face detecting section
22 Characteristic point detecting section (Detecting means)
23 Control point setting section (Control point setting means)
24 Grid point setting section (Grid point setting means)
25 Image transforming section (Image transforming means)
30 Image storage section
31 Table storage section
CI Captured image
FP Characteristic points (Characteristic information)
CP Control point
MV Movement amount vector (Movement information of control point)
GD Grid point
MVg Movement amount vector (Movement information of grid point)
MTx Table

The invention claimed is:

1. An image transforming device for transforming a part of a captured image of an object based on a predetermined type of transformation,
the image transforming device comprising:
an obtaining unit that obtains the captured image of the object;
a detecting unit that detects characteristic information from the captured image of the object, the characteristic information characterizing the object;
a control point setting unit that sets control points and movement information of the control points for the captured image, based on the characteristic information and on an arrangement pattern and a movement pattern each corresponding to the predetermined type of transformation;
a grid point setting unit that sets grid points for the captured image, and setting movement information of the grid points based on the control points and the movement information of the control points; and
an image transforming unit that transforms an image area by moving the grid points based on the movement information of the grid points, the image area being a quadrangle, the grid points being four vertices of the quadrangle.

2. The image transforming device according to claim 1, wherein, the image transforming means does not transform the image area when a statistic of a movement amount of the grid points provided in an image area to be transformed is less than a first predetermined value.

3. The image transforming device according to claim 2, wherein the image transforming unit transforms the image area by linear interpolation when the statistic of the movement amount of the grid points is not less than the first predetermined value and is less than a second predetermined value; and
wherein the image transforming unit transforms the image area by high-order interpolation when the statistic of the movement of the grid points is not less than the second predetermined value.

4. An electronic device comprising an image transforming device recited in claim 1.

5. An image transforming method for transforming a part of a captured image of an object based on a predetermined type of transformation,
the image transforming method comprising the steps of:
(a) obtaining the captured image of the object;
(b) detecting characteristic information from the captured image of the object, the characteristic information characterizing the object;
(c) setting control points and movement information of the control points for the captured image, based on the characteristic information and on an arrangement pattern and a movement pattern each corresponding to the predetermined type of transformation;
(d) setting grid points for the captured image, and setting movement information of the grid points based on the control points and the movement information of the control points; and
(e) transforming an image area by moving the grid points based on the movement information of the grid points the image area being a quadrangle, the grid points being four vertices of the quadrangle.

6. A tangible, non-transitory, computer-readable storage medium storing an image transforming program for causing an image transforming device to operate, the image transforming program transforming a part of a captured image of an object based on a predetermined type of transformation,
the image transforming program causing a computer to carry out the steps of:
(a) obtaining the captured image of the object;
(b) detecting characteristic information from the captured image of the object, the characteristic information characterizing the object;
(c) setting control points and movement information of the control points for the captured image, based on the characteristic information and on an arrangement pattern and a movement pattern each corresponding to the predetermined type of transformation;
(d) setting grid points for the captured image, and setting movement information of the grid points based on the control points and the movement information of the control points; and
(e) transforming an image area by moving the grid points based on the movement information of the grid points the image area being a quadrangle, the grid points being four vertices of the quadrangle.

* * * * *